J. REYNOLDS.

Improvement in Rein-Guides for Vehicles.

No. 131,704. Patented Sep. 24, 1872.

Witnesses
Jas. L. Ewin
Walter Allen

Inventor.
John Reynolds

AM. PHOTO-LITHOGRAPHIC CO.N.Y. (OSBORNE'S PROCESS.)

UNITED STATES PATENT OFFICE.

JOHN REYNOLDS, OF BALTIMORE, MARYLAND.

IMPROVEMENT IN REIN-GUIDES FOR VEHICLES.

Specification forming part of Letters Patent No. 131,704, dated September 24, 1872.

*To all whom it may concern:*

Be it known that I, JOHN REYNOLDS, of the city of Baltimore, in the State of Maryland, have invented an Improvement in Rein-Guides for Vehicles, of which the following is a specification:

Nature and Objects of the Invention.

This invention consists in the provision of rings or loops, of the form hereinafter described or its equivalent, to be attached to the rear part of the shafts, or preferably to the splinter-bar near to each shaft, to serve as guides for the reins, in order to keep them out of reach of the horse's tail, as hereinafter described.

General Description.

Figure 1:
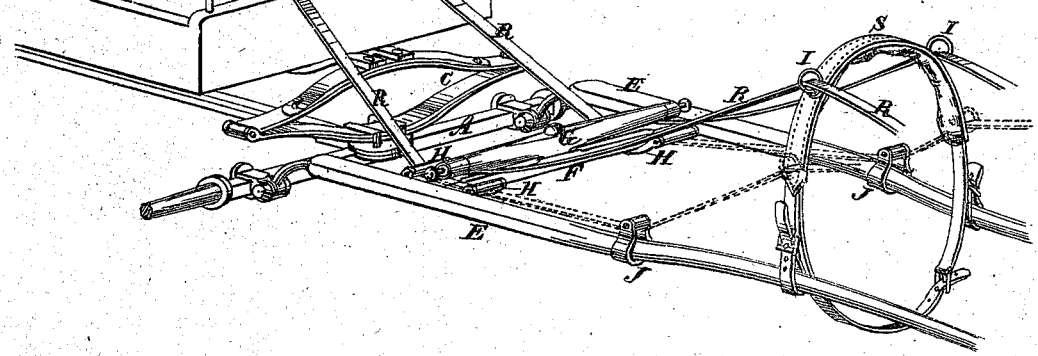
Figure 1 is a perspective view of the front of a carriage with my invention applied, illustrating its use with a low dash-board.
Figure 3:
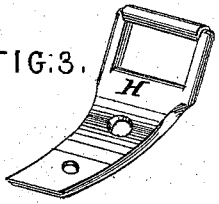
Fig. 3 is a perspective view of a single guide-loop detached.
Figure 2:
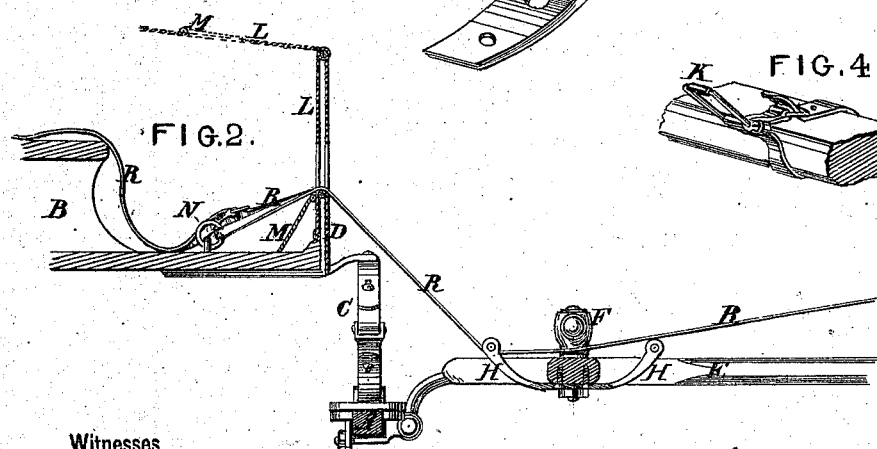
Fig. 2 is a vertical section, illustrating its application to a high dash-board.

A may represent the front axle, and B the bed or body, of a carriage, connected by the spring C. D is the dash-board. E E are the shafts, connected by the splinter-bar F. G represents the single-tree. The above parts may all be constructed and arranged in customary manner. H H represent my guide-loops or rings, which I prefer to make substantially as shown in Fig. 3, and to secure, by screwing, bolting, or riveting, beneath the splinter-bar F, near the ends thereof, or in close proximity to the shafts E E. The curved form of the shank of the loop causes the latter to project above the splinter-bar, as clearly represented in Fig. 2. The reins R R, after passing through terrets I I on the pad or saddle S in the usual way, are carried beneath the end of the single-tree G, and through the loops H H, whence they may pass over the top of a low dash-board, as illustrated in Fig. 1; or, if a high dash-board be used, they may pass through openings therein, as shown in Fig. 2; the apron L being also pierced for the passage of the reins, and being provided with flaps M to close the apertures therein when the apron is raised in inclement weather, as illustrated by dotted lines in Fig. 2. The loops may, if preferred, be made in double form, so as to provide additional guides I in front of the splinter-bar, as shown in Figs. 1 and 2, the reins being passed through the loops I, as shown by dotted lines in Fig. 1, before passing under the single-tree. Fig. 1 also illustrates the use of supplemental guide-loops J J applied to the shafts. The three pairs of loops H I J may all be used, if desired, or any one may be used without the others. More than one guide for each rein is not essential. Fig. 2 shows the rear guides H only in use.

Figure 4:
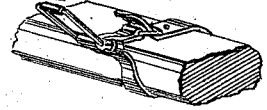
Fig. 4 is a perspective view of a modification consisting of a detachable guide-loop.

For employing my invention with vehicles not permanently fitted for its use I have devised detachable guide-loops K attached to straps, as illustrated in Fig. 4. These are especially convenient in the use of hired vehicles, the user being thus enabled to keep guide-loops which may be applied to the carriage and taken therefrom, as required.

When opportunity occurs to construct the harness with special reference to the use of my invention, it is considered preferable to set the terrets lower down on each side of the saddle or pad, as shown by dotted lines in Fig. 1. This is a matter of comparative indifference, but will necessitate less deflection of the reins. In either case the guides cause the reins to pass down along the horse's flanks instead of over the rump of the animal, and they are thus kept completely out of reach of its tail, allowing the animal to keep off flies with perfect freedom without danger of catching the reins. The guides arranged in any manner, substantially as described, also serve to keep the reins separate, so as to preclude the danger of the driver, when first catching hold of them in haste or in the dark, getting them transposed, as is not unfrequently done. The guides will also be seen to bring the rear part of the reins, where they pass into the vehicle, in such a position that the driver may exert his whole force, if necessary, in the most convenient manner.

A ring, N, in the floor of the carriage may afford a convenient place for hitching the reins, as shown in Fig. 2.

Claims.

I claim as my invention—

1. Loops H H, or their equivalents, as guides for the reins, applied to the rear part of the shafts or the splinter-bar, as and for the purpose set forth.

2. The guides J J, in combination with the loops H H, substantially as and for the purpose described.

JOHN REYNOLDS.

Witnesses:
W. C. HICKSON,
S. HENGST.